United States Patent
Kashima

(10) Patent No.: US 8,335,054 B2
(45) Date of Patent: Dec. 18, 2012

(54) HEAD SUSPENSION PIEZOELECTRIC ACTUATOR WITH A NONCONDUCTIVE ADHESIVE JOINING TOGETHER THE CIRCUMFERENTIAL EDGE OF AN ACTUATOR BASE OPENING WITH A CIRCUMFERENTIAL SIDE FACE OF THE PIEZOELECTRIC ELEMENT

(75) Inventor: Hideki Kashima, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 237 days.

(21) Appl. No.: 12/750,292

(22) Filed: Mar. 30, 2010

(65) Prior Publication Data

US 2010/0296201 A1  Nov. 25, 2010

(30) Foreign Application Priority Data

May 21, 2009  (JP) ................. P2009-123617

(51) Int. Cl.
*G11B 5/58* (2006.01)
*G11B 21/24* (2006.01)

(52) U.S. Cl. .................................. 360/294.4
(58) Field of Classification Search ............. 360/294.4
See application file for complete search history.

(56) References Cited

U.S. PATENT DOCUMENTS

| | | | |
|---|---|---|---|
| 7,035,055 B2 * | 4/2006 | Kikkawa et al. | 360/265.9 |
| 2002/0075605 A1 | 6/2002 | Nishida et al. | |
| 2002/0075606 A1 * | 6/2002 | Nishida et al. | 360/294.4 |
| 2002/0080532 A1 * | 6/2002 | Fujiwara et al. | 360/294.4 |
| 2002/0118492 A1 * | 8/2002 | Watanabe et al. | 360/294.4 |
| 2009/0086379 A1 * | 4/2009 | Hanya et al. | 360/294.4 |
| 2010/0073825 A1 * | 3/2010 | Okawara | 360/294.4 |
| 2010/0195252 A1 * | 8/2010 | Kashima | 360/294.4 |
| 2011/0216446 A1 * | 9/2011 | Iriuchijima | 360/294.4 |
| 2011/0249366 A1 * | 10/2011 | Fujimoto et al. | 360/294.4 |

FOREIGN PATENT DOCUMENTS

| | | |
|---|---|---|
| JP | 2002-184139 | 6/2002 |
| JP | 2002-184140 | 6/2002 |
| JP | 2002-251854 | 9/2002 |
| JP | 2009-080915 | 4/2009 |

* cited by examiner

*Primary Examiner* — Jefferson Evans
(74) *Attorney, Agent, or Firm* — Jordan and Hamburg LLP

(57) ABSTRACT

The piezoelectric actuator of a head suspension has an actuator base and at least a piezoelectric element, the actuator base connected to the base part of the load beam of the suspension and having at least an opening, the piezoelectric element attached to the opening and deforming in response to a voltage applied thereto to effect displacement of the front end of the load beam. A nonconductive filler is fitted into a circumferential channel defined between a circumferential edge of an opening in the actuator base and a circumferential side face of the piezoelectric element facing the circumferential edge of the opening to maintain a width of the circumferential channel. A nonconductive adhesive part is formed in the circumferential channel and joins the circumferential edge of the opening and the circumferential side face of the piezoelectric element together.

7 Claims, 8 Drawing Sheets

Fig.5A 1st comparative example
PZT X shift +110 μm
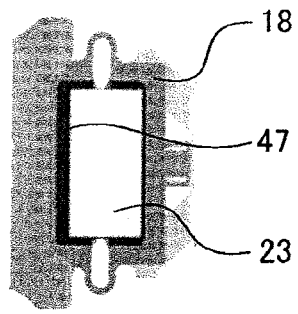
Fig.5B 2nd comparative example
PZT X shift −110 μm
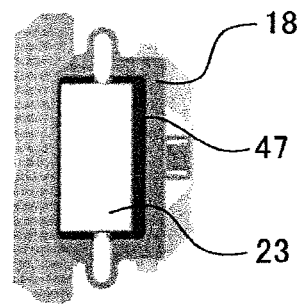
Fig.5C 3rd comparative example
PZT Y shift +110 μm
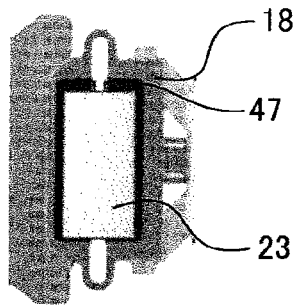
Fig.5D 4th comparative example
PZT Z UP 20 μm
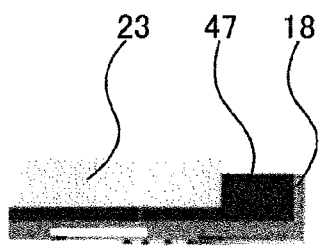
Fig.5E 5th comparative example
PZT rotation 4deg
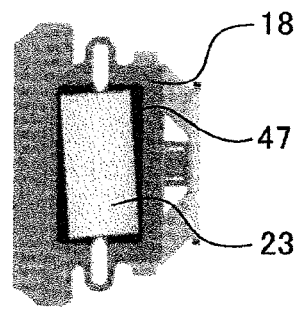

HEAD SUSPENSION PIEZOELECTRIC ACTUATOR WITH A NONCONDUCTIVE ADHESIVE JOINING TOGETHER THE CIRCUMFERENTIAL EDGE OF AN ACTUATOR BASE OPENING WITH A CIRCUMFERENTIAL SIDE FACE OF THE PIEZOELECTRIC ELEMENT

BACKGROUND OF THE INVENTION

1. Field of the Invention

The present invention relates to a head suspension for a disk drive incorporated in an information processing apparatus such as a personal computer, and particularly, to a head suspension having a piezoelectric element that is attached with a nonconductive adhesive and deforms in response to a voltage applied thereto.

2. Description of Related Art

Small-sized, precision information devices are rapidly advancing, and for use with such devices, needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

The magnetic disk drives are strongly expected to increase their storage capacities. Increasing the storage capacity of a magnetic disk drive is generally achievable by increasing the storage capacity of each magnetic disk in the magnetic disk drive. The storage capacity or recording density of a magnetic disk will increase, without changing the diameter thereof, if the number of tracks per inch (TPI) on the magnetic disk is increased, i.e., if the width of a track is narrowed. For this, a magnetic head of a head suspension installed in the magnetic disk drive must conduct a precise positioning operation in a direction across the tracks, i.e., a sway direction. For realizing the precise positioning operation, an actuator capable of accurately moving and positioning the magnetic head in a very small section is needed.

To meet the need, the applicant of the present invention has proposed in Japanese Unexamined Patent Application Publication No. 2002-184140 a head suspension for a disk drive. The head suspension includes a base plate, a connection plate having a hinge thinner than the base plate, a load beam provided with a flexure, and a piezoelectric actuator having a pair of piezoelectric elements.

This related art employs a dual actuator system that involves, for a precise positioning purpose, a voice coil motor and the piezoelectric actuator having two piezoelectric elements made of, for example, PZT (lead zirconate titanate).

The piezoelectric actuator in the dual actuator system minutely moves a front end of the load beam in a widthwise direction (sway direction) of the head suspension. Compared with a single actuator system employing only the voice coil motor, the dual actuator system employing the voice coil motor and piezoelectric actuator is capable of more precisely positioning a magnetic head attached to a front end of the head suspension.

An important issue for the head suspension employing the dual actuator system is to protect the brittle piezoelectric elements from damage and secure electric insulation between the head suspension body and the piezoelectric elements.

One approach to address the issue is disclosed in the above-mentioned Japanese Unexamined Patent Application Publication No. 2002-184140. As mentioned above, the head suspension of this related art includes a pair of piezoelectric elements that is arranged on an actuator base connected to the load beam. The actuator base has openings in which the piezoelectric elements are fixed with an adhesive layer. The adhesive layer consists of a nonconductive adhesive and fillers. The fillers interpose between the piezoelectric elements and the actuator base to secure a clearance for electrically insulating the piezoelectric elements from the actuator base of the head suspension.

This related art is capable of surely insulating the piezoelectric elements and the actuator base from each other without damaging the piezoelectric elements.

The related art is effective to secure a minute clearance in a thickness direction when fixing the piezoelectric elements to the openings of the actuator base with the adhesive layer.

In a plane orthogonal to the thickness direction, a gap is also needed between a circumferential edge of the opening and a circumferential side face of the piezoelectric element. According to the related art, this gap must be relatively large to cover dimensional allowances of each opening and piezoelectric element, an operational error of an automatic assembling machine used to attach the piezoelectric elements to the openings, and the like.

The related art, however, takes no measures to correctly keep the gap between the circumferential edge of the opening and the circumferential side face of the piezoelectric element, properly fill the gap with a nonconductive material, and secure electric insulation between an electrode of the piezoelectric element and the actuator base.

SUMMARY OF THE INVENTION

An object of the present invention is to provide a head suspension that properly keeps and fills a gap between a circumferential edge of an opening formed in an actuator base of the head suspension and a circumferential side face of a piezoelectric element embedded in the opening and secures electric insulation between an electrode of the piezoelectric element and the actuator base.

In order to accomplish the object, an aspect of the present invention provides a head suspension having a load beam and a piezoelectric actuator, the piezoelectric actuator supporting a base part of the load beam and configured to displace a front end of the load beam in a sway direction. The piezoelectric actuator has an actuator base and at least a piezoelectric element, the actuator base connected to the base part of the load beam and having at least an opening, the piezoelectric element attached to the opening and deforming in response to a voltage applied thereto to conduct displacement of the front end of the load beam. The head suspension also has a circumferential edge of the opening, configured to define the opening in the actuator base, a circumferential side face of the piezoelectric element, facing the circumferential edge of the opening, a circumferential channel defined between the circumferential edge of the opening and the circumferential side face of the piezoelectric element, a nonconductive filler fitted into the circumferential channel to maintain a width of the circumferential channel, and a nonconductive adhesive part formed in the circumferential channel and joining the circumferential edge of the opening and the circumferential side face of the piezoelectric element together.

According to this aspect of the present invention, the circumferential channel between the circumferential edge of the opening and the circumferential side face of the piezoelectric element is filled with the nonconductive adhesive part and the nonconductive filler is fitted into the circumferential channel. This configuration secures the width of the circumferential channel when the piezoelectric element is attached to the opening, thereby securing electric insulation between an electrode of the piezoelectric element and the actuator base.

BRIEF DESCRIPTION OF THE DRAWINGS

FIGS. 5(A) to 5(E) are plan views illustrating piezoelectric elements (each indicated as "PZT") attached to openings of head suspensions according to comparative examples, in which FIG. 5(A) is a first comparative example with the PZT shifted by +110 µm in an X-direction, FIG. 5(B) is a second comparative example with the PZT shifted by −110 µm in the X-direction, FIG. 5(C) is a third comparative example with the PZT shifted by +110 µm in a Y-direction, FIG. 5(D) is a fourth comparative example with the PZT shifted by +20 µm in a Z-direction, and FIG. 5(E) is a fifth comparative example with the PZT turned by 4 degrees in a counterclockwise direction;

DETAILED DESCRIPTION OF EMBODIMENTS

Head suspensions according to embodiments of the present invention will be explained in detail with reference to the drawings.

Figure 1:
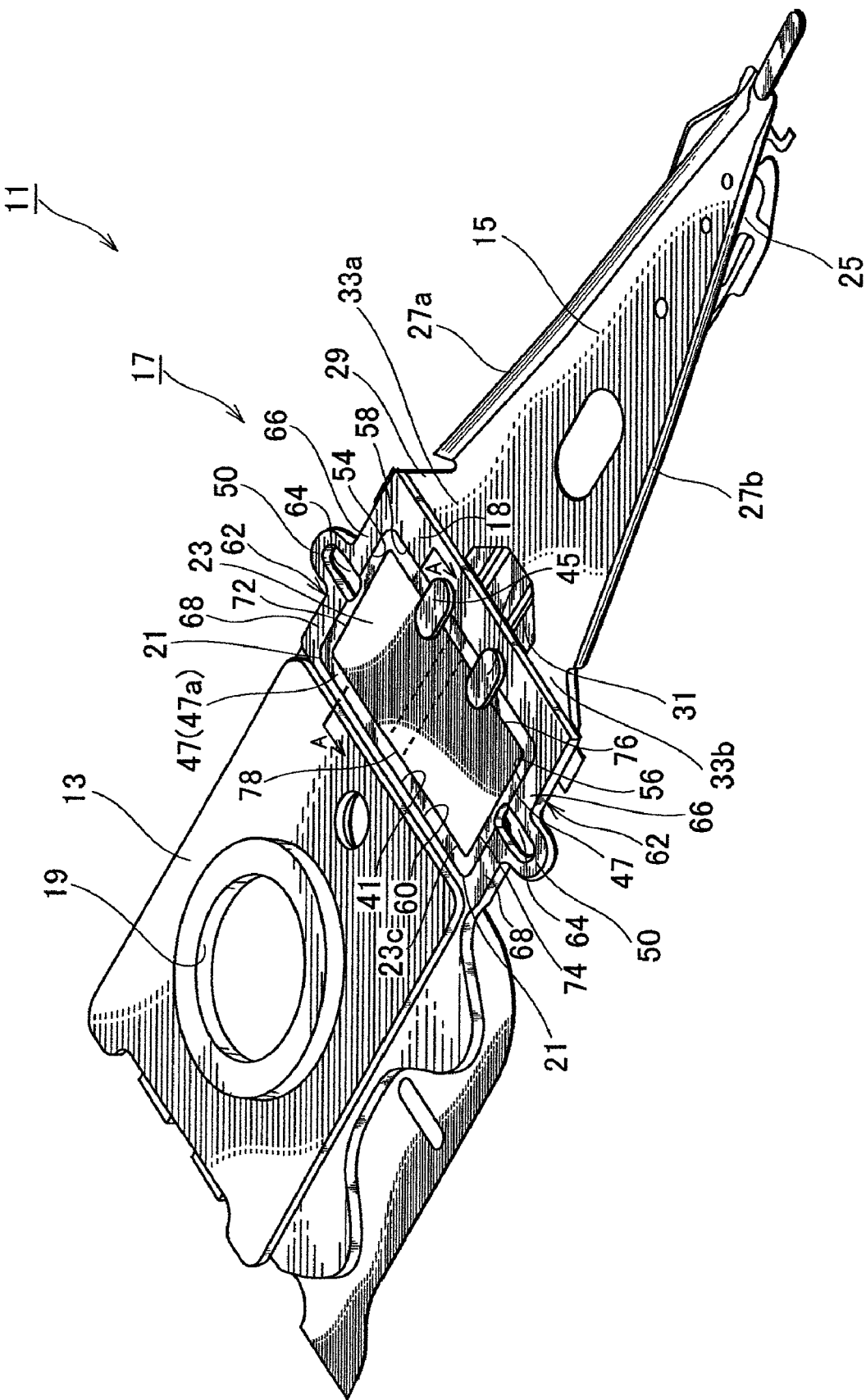
FIG. 1 is a perspective view illustrating a head suspension according to a first embodiment of the present invention.

FIG. 1 is a perspective view illustrating a head suspension 11 according to the first embodiment of the present invention. In FIG. 1, the head suspension 11 has a base plate 13, a load beam 15, and a piezoelectric actuator 17.

The base plate 13 is a metal thin plate made of, for example, stainless steel and has a thickness of about 150 to 200 µm. The base plate 13 may be made of light metal such as aluminum alloy or a clad material having of light metal and stainless steel. The light metal can reduce the inertia of the base plate 13, increase the resonant frequency of the head suspension 11 in a sway direction, i.e., a widthwise direction of the head suspension 11, and improve the tracing performance of the head suspension 11.

The base plate 13 has a circular boss 19. With the boss 19, the base plate 13 is attached to a front end of an actuator arm (not illustrated) and is turned by a voice coil motor (not illustrated). The base plate 13 has a front end in the vicinity of the load beam 15 and a rear end opposite to the front end. The front end of the base plate 13 is connected through the piezoelectric actuator 17 to the load beam 15. The details of the piezoelectric actuator 17 will be explained later.

The load beam 15 applies load onto a slider (not illustrated). The load beam 15 is a resilient metal thin plate made of, for example, stainless steel and has a thickness of about 30 to 150 µm. Like the base plate 13, the load beam 15 may be made of light metal such as aluminum alloy or a clad material having of light metal and stainless steel.

The load beam 15 has a flexure 25 whose front end supports the slider that has a magnetic head. The load beam 15 has bent edges 27a and 27b extending across the sway direction, to reinforce the stiffness of the load beam 15.

A rear end of the load beam 15 is integral with a connection plate 29. The connection plate 29 is a resilient metal thin plate made of, for example, stainless steel and has a thickness of about 30 µm. The connection plate 29 has a hole 31. The hole 31 reduces the thickness-wise bending stiffness and weight of the connection plate 29. On each side of the hole 31, the connection plate 29 has hinges 33a and 33b that are bendable in a thickness direction. A rear end of the connection plate 29, i.e., a base part of the load beam 15 is attached to a front end of the piezoelectric actuator 17.

Figure 2:
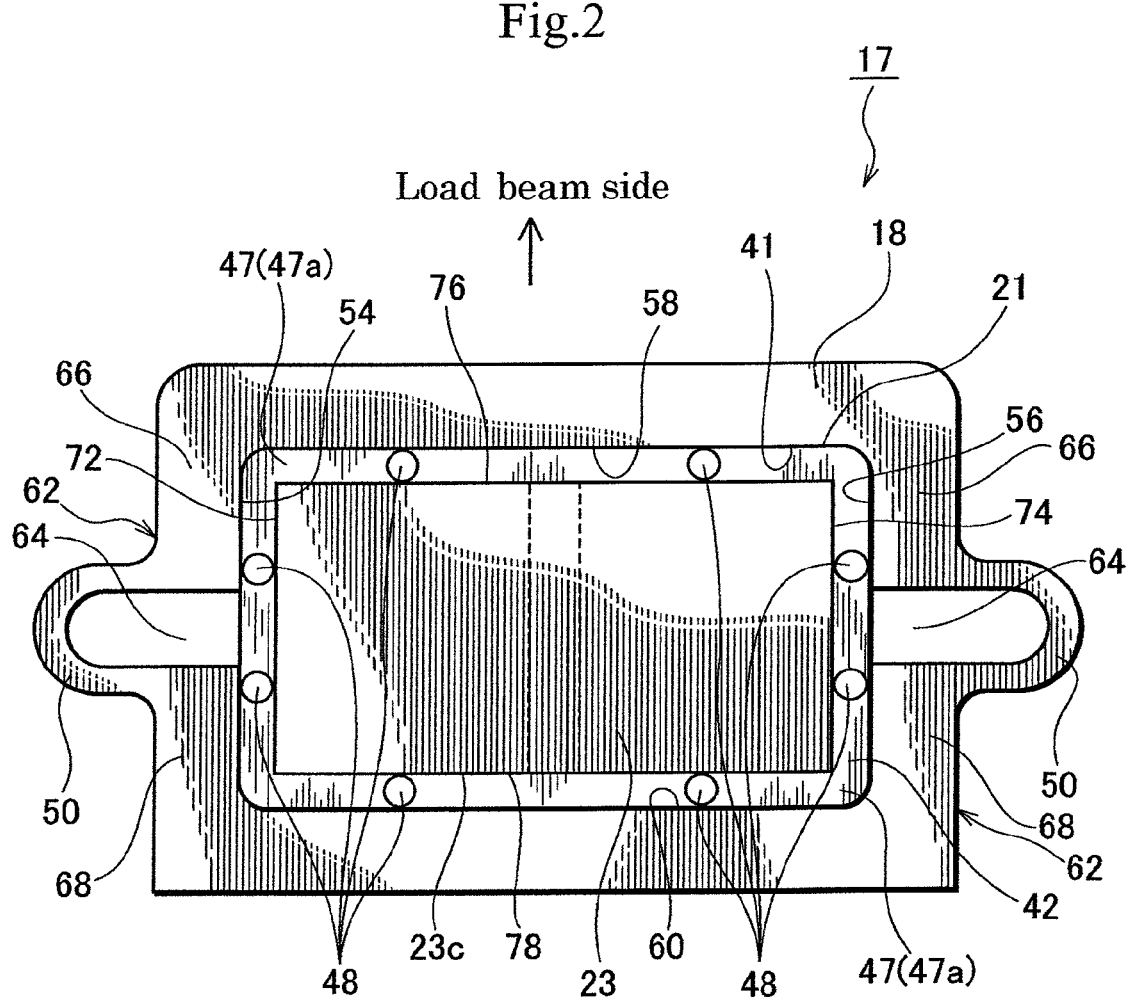
FIG. 2 is an enlarged plan view illustrating a piezoelectric actuator of the head suspension of FIG. 1.
Figure 3:
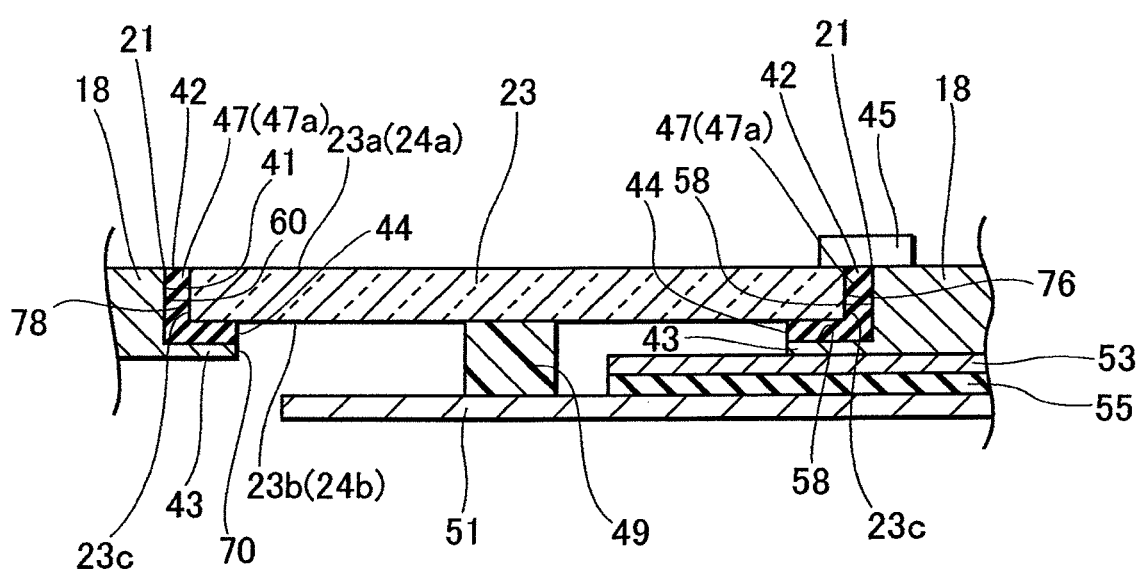
FIG. 3 is a sectional view taken along a line A-A of FIG. 1.

The piezoelectric actuator 17 that is an essential part of the head suspension 11 according to the embodiment 1 will be explained also with reference to FIGS. 2 and 3 in which FIG. 2 is an enlarged plan view illustrating the piezoelectric actuator 17 and FIG. 3 is a sectional view taken along a line A-A of FIG. 1.

When designing the piezoelectric actuator 17, considerations must be made to effectively transfer a distortion (displacement) of the piezoelectric element 23 to the load beam 15, secure electric insulation between an electrode of the piezoelectric element 23 and an actuator base 18, prevent dust from dropping off a circumferential side surface 23c of the piezoelectric element 23, and protect the brittle piezoelectric element 23 from being damaged.

In consideration of these points, the piezoelectric actuator 17 of the first embodiment is accomplished.

As shown in FIGS. 1 and 2, the piezoelectric actuator 17 functions to support a base part of the load beam 15 and move a front end of the load beam 15 in a sway direction (a widthwise direction of the load beam 15). The piezoelectric actuator 17 includes the actuator base 18 and piezoelectric element 23.

The actuator base 18 is a metal thin plate made of, for example, stainless steel, interposes between the base plate 13 and the load beam 15, and is discrete from the base plate 13 and load beam 15. A front end of the actuator base 18 is in the vicinity of the load beam 15 and a rear end thereof is in the vicinity of the base plate 13.

A bottom face of the front end of the actuator base 18 is laid on the rear end of the connection plate 29, i.e., the base part of the load beam 15 and is fixed thereto by, for example, laser welding. The rear end of the actuator base 18 is laid on the front end of the base plate 13 and is fixed thereto by, for example, laser welding.

The actuator base 18 may be integral with the base plate 13. In this case, pressing, for example, is employed to punch the integrated base plate 13 and actuator base 18 out of a metal thin plate made of, for example, stainless steel.

The integrated base plate 13 and actuator base 18 is also referred to as "actuator base". Namely, according to the present invention, the "actuator base" can represent both the base plate 13 and actuator base 18.

The actuator base 18 has an opening 21 accommodating the piezoelectric element 23. The opening 21 has a rectangular shape elongated in a width direction of the head suspension 11 and is defined with a circumferential edge 41 in the actuator base 18. The circumferential edge 41 includes a left edge 54, a right edge 56, a front edge 58, and a rear edge 60. The left and right edges 54 and 56 are formed by walls 62, respectively.

Each wall 62 is on an outer side of the opening 21 and is integral with the actuator base 18. Substantially at a longitudinal center, the wall 62 has a cut 64 that divides the wall 62 into a front wall 66 and a rear wall 68. The front and rear walls 66 and 68 are connected to each other with a flexible link 50.

The flexible link 50 has a U-shape that outwardly protrudes. The flexible links 50 on each side of the opening 21 function to improve stiffness of the piezoelectric actuator 17 and bend during a sway operation of the piezoelectric actuator 17 so as not to prevent a displacing stroke of the piezoelectric actuator 17.

As shown in FIG. 3, the opening 21 is provided with a bottom receiver 43 having a flange shape. The bottom receiver 43 is integral with a lower end of the circumferential edge 41 of the opening 21 and inwardly protrudes from the circumferential edge 41. The bottom receiver 43 is formed by partly thinning the actuator base 18 by, for example, half-etching technique.

The bottom receiver 43 has a communication hole 70 that connects the opening 21 to a bottom face side of the actuator base 18.

As shown in FIGS. 1-3, the opening 21 receives the piezoelectric element 23. The piezoelectric element 23 deforms in response to a voltage applied to an electrode 24 thereof, so that the piezoelectric actuator 17 moves the front end of the load beam 15 in a sway direction.

The piezoelectric element 23 has a thickness of about 0.07 mm to 0.20 mm and is made of piezoelectric ceramics such as PZT (piezoelectric zirconate titanate). The piezoelectric element 23 has a rectangular shape whose outer dimensions are slightly smaller than inner dimensions of the opening 21. The piezoelectric element 23 has the circumferential side surface 23c that faces the circumferential edge 41 of the opening 21.

The circumferential side surface 23c includes left and right side faces 72 and 74 facing the left and right edges 54 and 56 of the opening 21, respectively, and front and rear side faces 76 and 78 facing the front and rear edges 58 and 60 of the opening 21, respectively.

The piezoelectric element 23 has a top surface 23a that is substantially flush with a top face of the actuator base 18. The piezoelectric element 23 also has a bottom surface 23b whose periphery opposes the bottom receiver 43 of the opening 21 in a thickness direction. Namely, the bottom receiver 43 of the opening 21 opposes the periphery of the bottom surface 23b of the piezoelectric element 23c. An inner side of the bottom surface 23b of the piezoelectric element 23 faces the outside of the bottom face of the actuator base 18 through the communication hole 70 of the bottom receiver 43.

The top surface 23a and bottom surface 23b of the piezoelectric element 23 each include the electrode 24. The electrode 24 is made of a material having a low contact resistance and a good conductivity, such as gold (Au) and is formed by, for example, vapor deposition, spattering, or plating.

The electrode 24a on the top surface 23a of the piezoelectric element 23 is grounded to the actuator base 18 through conductive resin 45 such as silver paste.

The electrode 24b on the bottom surface 23b of the piezoelectric element 23 is connected through a conductive adhesive 49 to wiring 51 made of, for example, copper formed on the flexure 25. The flexure 25 includes a metal base 53, an electric insulating layer 55 formed on the metal base 53, and the wiring 51 formed on the insulating layer 55. Connection between the electrode 24b on the bottom surface 23b of the piezoelectric element 23 and the wiring 51 of the flexure 25 may be achieved by, instead of the conductive adhesive 49, wire bonding, soldering, or ultrasonic bonding.

When the piezoelectric element 23 is set at a predetermined position in the opening 21, the circumferential edge 41 of the opening 21 substantially entirely surrounds the circumferential side surface 23c of the piezoelectric element 23, to form a circumferential gap between them. This gap is a circumferential channel 42 between the circumferential side surface 23c of the piezoelectric element 23 and the circumferential edge 41 of the opening 21. Also, the bottom surface 23b of the piezoelectric element 23 forms a predetermined gap 44 with respect to the bottom receiver 43 of the opening 23.

In the circumferential channel 42 and gap 44, a nonconductive adhesive part 47a is formed with a nonconductive adhesive 47, as illustrated in FIGS. 2 and 3. The nonconductive adhesive 47 may be any known nonconductive adhesive, or any conductive adhesive containing insulating material such as silica particles or glass particles. The nonconductive adhesive 47 contains small-diameter fillers (not illustrated). The small-diameter fillers are disclosed in, for example, the above-mentioned Japanese Unexamined Patent Application Publication No. 2002-184140, and each have a diameter of about 10 μm.

The nonconductive adhesive part 47a fills the channel 42 between the circumferential side surface 23c of the piezoelectric element 23 and the circumferential edge 41 of the opening 21 and joins the piezoelectric element 23 and opening 21 together. In addition, the adhesive part 47a fills the gap 44 between the bottom surface 23b of the piezoelectric element 23 and the bottom receiver 43 of the opening 21 and joins the piezoelectric element 23 and opening 21 together. Consequently, the head suspension 11 of the first embodiment effectively transfers a distortion (displacement) of the piezoelectric element 23 to the load beam 15.

In the circumferential channel 42, a plurality of nonconductive fillers 48 (large-diameter fillers) are arranged. The fillers 48 are made of material such as silica or glass that is electrically insulative and is resistive against deformation under compressive load. According to the first embodiment, each filler 48 is shaped spherical. An outer diameter of the filler 48 is equal to or slightly smaller than the width of the circumferential channel 42, i.e., the gap between the circumferential edge 41 of the opening 21 and the circumferential side surface 23c of the piezoelectric element 23. For example, if the width of the circumferential channel 42 is about 200 μm, the outer diameter of the filler 48 is substantially equal to the width or in the range of 150 to 198 μm.

In the circumferential channel 42, the nonconductive fillers 48 are embedded in the nonconductive adhesive part 47a. Namely, the fillers 48 are fitted into the space between the circumferential edge 41 of the opening 21 and the circumferential side surface 23c of the piezoelectric element 23. Interposed between the circumferential edge 41 of the opening 21 and the circumferential side surface 23c of the piezoelectric element 23, the fillers 48 are in contact with the circumferential edge 41 and circumferential side surface 23c, thereby keeping the distance (width) of the circumferential channel 42.

Although the nonconductive fillers 48 are in contact with the circumferential edge 41 of the opening 21 and the circumferential side surface 23c of the piezoelectric element 23, the above-mentioned dimensions of the fillers 48 and circumferential channel 42 are set to secure a minute fitting clearance between the fillers 48 and the circumferential edge 41 and circumferential side surface 23c.

The nonconductive fillers 48 are arranged along each side of the piezoelectric element 23 in the longitudinal direction and the lateral direction, so that the fillers 48 can maintain the width of the circumferential channel 42 constant entirely along the channel 42, to correctly position and keep the piezoelectric element 23 in the opening 21.

The first embodiment arranges every two nonconductive fillers 48 between the front edge 58 of the circumferential edge 41 and the front side face 76 of the circumferential side surface 23c, between the rear edge 60 and the rear side face 78, between the left edge 54 and the left side face 72, and between the right edge 56 and the right side face 74. Namely, each four fillers 48 on each pair of opposing sides of the piezoelectric element 23 support the piezoelectric element 23 in longitudinal and widthwise directions.

The fillers 48 on opposite sides of the piezoelectric element 23 are symmetrical with respect to the center of the piezoelectric element 23 as illustrated in FIG. 2.

When setting the piezoelectric element 23 in the opening 21, it is preferable to align a center axis of the actuator base 18 in a thickness direction with a center axis of the piezoelectric element 23 in the thickness direction. This prevents a torsional motion of the piezoelectric actuator 17 during a sway operation.

Attaching the piezoelectric element 23 to the opening 21 of the actuator base 18 will be explained with reference to a flowchart of FIG. 4.

Step S1 applies the nonconductive adhesive 47 containing the small-diameter nonconductive fillers into the circumferential channel 42 and gap 44. The nonconductive adhesive 47 may be one without the small-diameter nonconductive fillers.

Step S2 places the piezoelectric element 23 (indicated as "PZT" in FIG. 4) at a predetermined position in the opening 21.

Step S3 embeds the large-diameter nonconductive fillers 48 into the circumferential channel 42 along each side of the piezoelectric element 23. With this arrangement, the fillers 48 keep the width of the circumferential channel 42 entirely along the length thereof and secure the piezoelectric element 23 at the predetermined position in the opening 21.

As mentioned above, the first embodiment arranges every two nonconductive fillers 48 between the front edge 58 of the circumferential edge 41 and the front side face 76 of the circumferential side surface 23c, between the rear edge 60 and the rear side face 78, between the left edge 54 and the left side face 72, and between the right edge 56 and the right side face 74. Namely, each four fillers 48 on each pair of opposing sides of the piezoelectric element 23 stably support the piezoelectric element 23 in an aligned state in longitudinal and widthwise directions.

Since the fillers 48 on opposite sides of the piezoelectric element 23 are symmetrical with respect to the center of the piezoelectric element 23, the piezoelectric element 23 is stably kept in the aligned state.

The number of fillers 48 in the circumferential channel 42 on each side of the piezoelectric element 23 may be one instead of two. This configuration also keeps the piezoelectric element 23 in the aligned state.

Even if two filler 48 are arranged on one pair of opposing sides of the piezoelectric element 23, three or more fillers 48 may be arranged on the other pair of opposing sides, to stably support the piezoelectric element 23.

Figure 4:
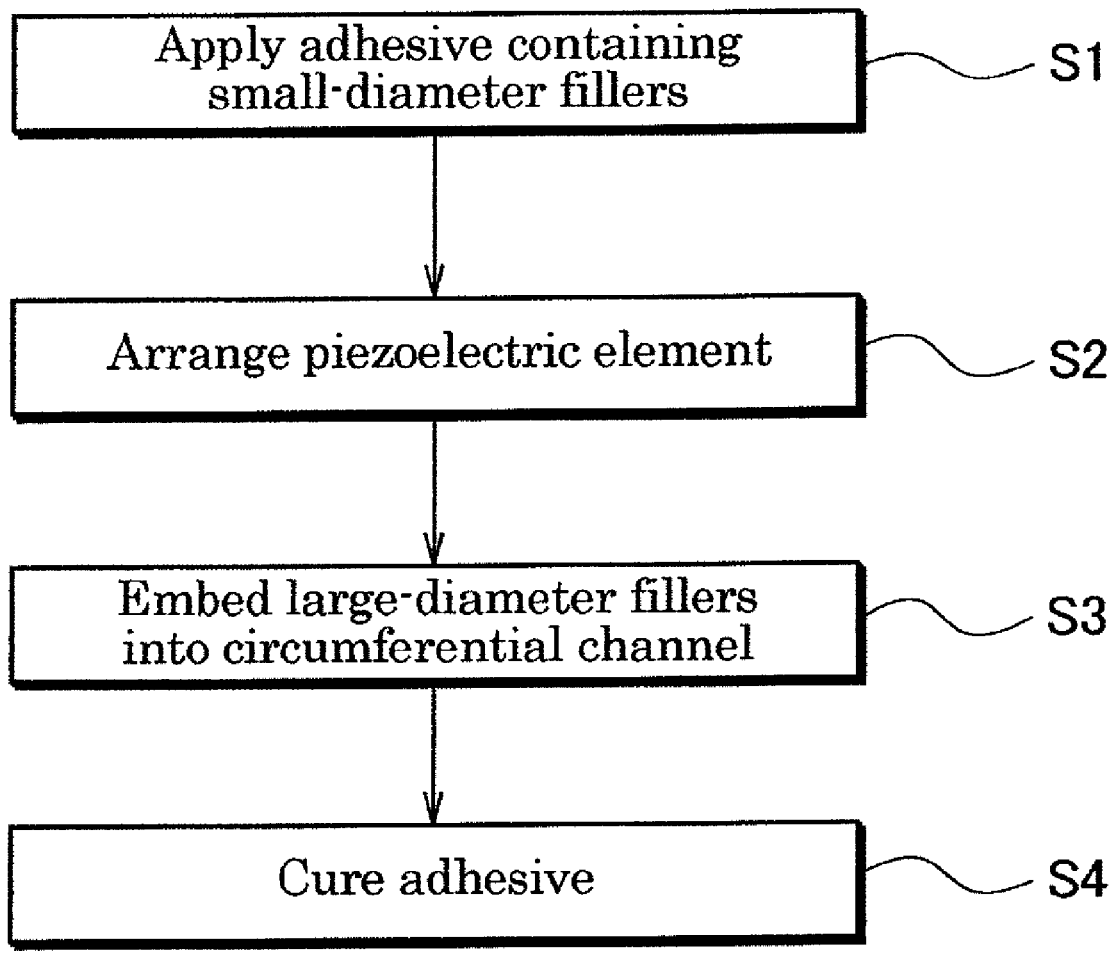
FIG. 4 is a flowchart illustrating steps of attaching a piezoelectric element to an opening of the head suspension according to the first embodiment.

In this way, the piezoelectric element 23 is temporarily attached to the opening 21 of the actuator base 18 up to Step S3 of FIG. 4.

Step S4 heat-treats the head suspension 11 with the piezoelectric element 23 temporarily attached to the opening 21. The heat treatment is carried out in, for example, an electric furnace at a predetermined temperature for a predetermined time. This cures the nonconductive adhesive 47 to form the nonconductive adhesive part 47a.

Operation of the head suspension 11 formed through the above-mentioned steps will be explained.

The piezoelectric actuator 17 of the head suspension 11 displaces the front end of the load beam 15 in a sway direction according to deformation of the piezoelectric element 23 that occurs when a voltage is applied thereto. When applied a voltage, the piezoelectric element 23 deforms into a trapezoid with one lateral side thereof along a center axis (refer to two dotted lines in FIG. 2) longitudinally extending and the other lateral side thereof longitudinally contracting.

According to the directions and strokes of the extension and contraction of the piezoelectric element 23, the piezoelectric actuator 17 moves the front end of the load beam 15 in a sway direction, i.e., a widthwise direction of the head suspension 11 for a very small distance.

In the piezoelectric actuator 17, the circumferential side surface 23c of the piezoelectric element 23 is substantially entirely surrounded by the circumferential edge 41 of the opening 21. The gap between the circumferential side surface 23c and the circumferential edge 41 is filled with the nonconductive adhesive part 47a made of the nonconductive adhesive 47.

With this, the piezoelectric actuator 17 effectively transmits a distortion (displacement) of the piezoelectric element 23 through the nonconductive adhesive part 47a and actuator base 18 to the load beam 15, thereby smoothly and correctly moving the front end of the load beam 15 in the sway direction.

The nonconductive fillers 48 in the circumferential channel 42 align the piezoelectric element 23 with respect to the opening 21, thereby surely transferring the distortion (displacement) of the piezoelectric element 23 through the nonconductive adhesive part 47a and actuator base 18 to the load beam 15 and smoothly and correctly moving the front end of the load beam 15 in the sway direction.

According to the first embodiment, the bottom receiver 43 inwardly protrudes from the circumferential edge 41 of the opening 21 and faces the periphery of the bottom surface 23b of the piezoelectric element 23. The gap between the bottom receiver 43 and the bottom surface 23b of the piezoelectric element 23 is filled with the nonconductive adhesive part 47a, to surely fix the bottom surface 23b of the piezoelectric element 23 to the bottom receiver 43 and support the bottom surface 23b from below. This results in smoothly and correctly moving the front end of the load beam 15 in the sway direction.

Dynamic characteristic evaluation tests are carried out on the head suspension 11 of the first embodiment and on head suspensions of comparative examples.

FIGS. 5(A) to 5(E) are plan views illustrating piezoelectric elements (each indicated as "PZT") attached to openings of the head suspensions according to the comparative examples, in which FIG. 5(A) is a first comparative example with the PZT shifted by +110 μm in an X-direction, FIG. 5(B) is a second comparative example with the PZT shifted by −110 μm in the X-direction, FIG. 5(C) is a third comparative example with the PZT shifted by +110 μm in a Y-direction, FIG. 5(D) is a fourth comparative example with the PZT shifted by +20 μm in a Z-direction, and FIG. 5(E) is a fifth comparative example with the PZT turned by 4 degrees in a counterclockwise direction. Here, the X-direction is a longitudinal direction of the load beam 15 with "+" being a front side and "−" being a rear side. The Y-direction is a width direction of the load beam 15 with "+" being a right side and "−" being a left side. The Z-direction is a thickness direction of the load beam 15 with "+" being an upper side and "−" being a lower side.

According to the first embodiment, the piezoelectric element (PZT) 23 is attached in a correct state to the opening 21.

According to the first comparative example of FIG. 5(A), the piezoelectric element (PZT) 23 deviates from the correct state by +110 µm in the X-direction.

According to the second comparative example of FIG. 5(B), the piezoelectric element (PZT) 23 deviates from the correct state by −110 µm in the X-direction.

According to the third comparative example of FIG. 5(C), the piezoelectric element (PZT) 23 deviates from the correct state by +110 µm in the Y-direction.

According to the fourth comparative example of FIG. 5(D), the piezoelectric element (PZT) 23 deviates from the correct state by +20 µm in the Z-direction.

According to the fifth comparative example of FIG. 5(E), the piezoelectric element (PZT) 23 deviates from the correct state by four degrees in a counterclockwise direction.

Figure 6:
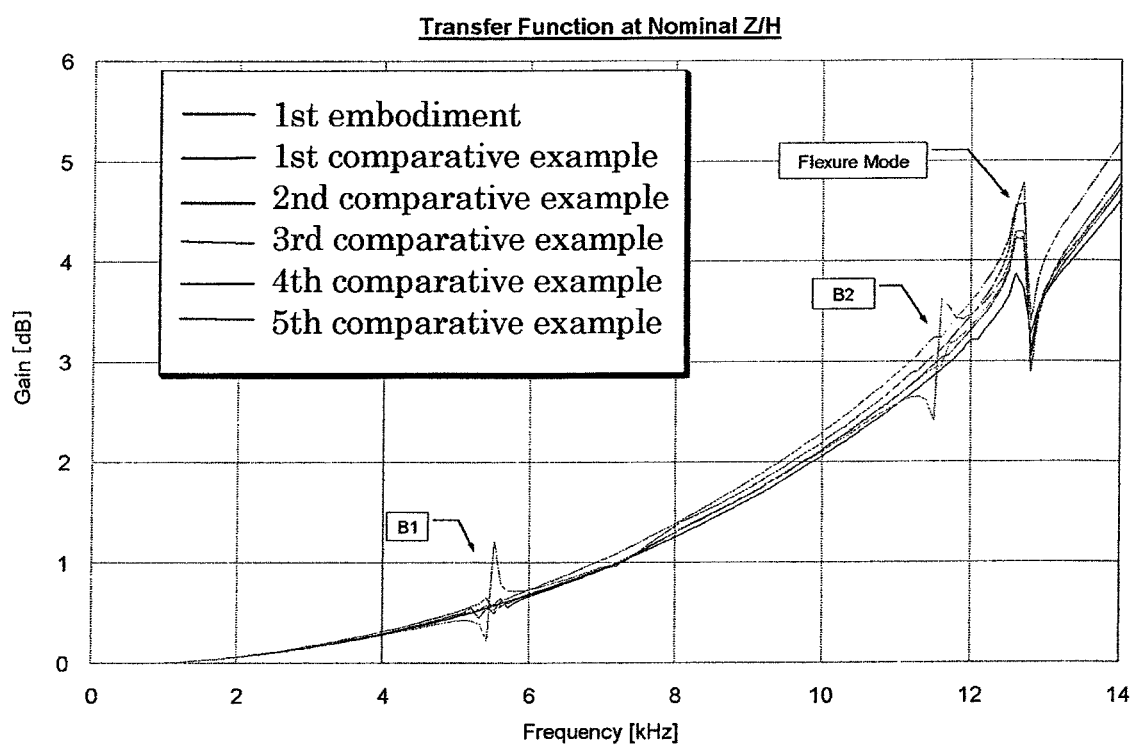
FIG. 6 is a graph illustrating dynamic characteristics of the head suspensions according to the comparative examples and first embodiment.

These head suspensions of the first embodiment and the first to fifth comparative examples are tested and test results are modeled and analyzed according to FEM (finite element method) to find dynamic characteristics of the head suspensions. FIG. 6 is a graph illustrating the found dynamic characteristics of the head suspensions.

When the piezoelectric element (PZT) 23 deviates from the correct state, in particular, when it turns like the fifth comparative example, first-order (B1) and second-order (B2) bending modes occur that are usually not observed.

Compared with the first to fifth comparative examples, the first embodiment of the present invention demonstrates a gain (the ordinate of the graph of FIG. 6) that is sufficiently suppressed substantially through an entire frequency band (the abscissa of the graph of FIG. 6).

It is understood from the test results that the head suspension 11 with the correctly attached piezoelectric element 23 according to the first embodiment demonstrates good dynamic characteristics compared with the first to fifth comparative examples with the piezoelectric elements 23 deviating from the correct state. Attaching the piezoelectric element 23 to the opening 21 in the correct state is important to stabilize the dynamic characteristics of the head suspension 11.

In the head suspension 11 according to the first embodiment, the circumferential edge 41 of the opening 21 in the actuator base 18 substantially wholly surrounds the circumferential side surface 23c of the piezoelectric element 23 in such a way as to form the circumferential channel 42 between the circumferential edge 41 and the circumferential side surface 23c. The nonconductive adhesive part 47a is formed in the circumferential channel 42 and the nonconductive fillers 48 are fitted into the circumferential channel 42 to keep the gap between the circumferential edge 41 and the circumferential side surface 23c.

In this way, the first embodiment maintains a uniform distance between the circumferential edge 41 of the opening 21 and the circumferential side surface 23c of the piezoelectric element 23, fixes the piezoelectric element 23 to the opening 21, and secures electric insulation between the electrode of the piezoelectric element 23 and the actuator base 18.

According to the first embodiment, the nonconductive adhesive part 47a is present substantially entirely along the circumferential channel 42, to effectively transmit a distortion (displacement) of the piezoelectric element 23 to the load beam 15, prevent dust from dropping off the circumferential side surface 23c of the piezoelectric element 23, and protect the piezoelectric element 23 that is brittle from damage.

According to the first embodiment, the nonconductive fillers 48 are forcibly embedded into the circumferential channel 42, so that the piezoelectric element 23 may adjust itself to the correct state in the opening 21. Namely, the piezoelectric element 23 self-aligns itself to the correct state.

The ability of self-alignment of the piezoelectric element 23 according to the first embodiment helps securing electric insulation between the electrode of the piezoelectric element 23 and the actuator base 18.

The self-alignment ability also helps putting the piezoelectric element 23 into the correct state in the opening 21, to stabilize the dynamic characteristics of the head suspension 11.

The diameter of each nonconductive filler 48 according to the first embodiment is equal to or slightly smaller than the gap between the circumferential edge 41 of the opening 21 and the circumferential side surface 23c of the piezoelectric element 23. This configuration simply and surely maintains the width of the circumferential channel 42 and the correct state of the piezoelectric element 23 in the opening 21.

According to the first embodiment, the opening 21, nonconductive adhesive part 47a, nonconductive fillers 48, and piezoelectric element 23 join together, so that the joined body functions as an integrated support beam to improve stiffness of the head suspension 11.

According to the first embodiment, the flexible links 50 are formed on each side of the opening 21. Each flexible link 50 has a U-shape that protrudes outwardly from the actuator base 18, to improve the stiffness of the piezoelectric actuator 17 without preventing a displacement stroke of the piezoelectric actuator 17 during a sway motion.

The head suspension 11 of the first embodiment, therefore, secures basic characteristics such as vibration and impact characteristics without deteriorating a displacement stroke of the piezoelectric actuator 17.

A head suspension according to the second embodiment of the present invention will be explained with reference to FIG. 7.

The head suspension 61 according to the second embodiment is configured basically the same as the head suspension 11 of the first embodiment. In this embodiment, like parts are represented with like reference marks of the first embodiment and differences between the first and second embodiments will mainly be explained.

According to the first embodiment, the piezoelectric actuator 17 of the head suspension 11 has the flexible links 50 on outer sides of the opening 21 of the actuator base 18, each of the flexible links 50 having a U-shape protruding outwardly from the opening 21.

According to the second embodiment, the head suspension 61 has a piezoelectric actuator 63 having an actuator base 18 in which an opening 21 is formed. On each outer side of the opening 21, a clearance 52 instead of the flexible link 50 of the first embodiment is formed.

Each clearance 52 is formed by cutting a wall 62 that forms an outer side of a circumferential edge of the opening 21. Namely, the clearance 52 divides the wall 62 into a front wall 66 and a rear wall 68. By separating the actuator base 18 on each outer side of the opening 21, the clearances 52 allows a load beam 15 of the head suspension 61 to move in a sway direction.

The front wall 66 and rear wall 68 are close to each other so that a widthwise dimension of the clearance 52 is larger than a front-rear dimension thereof. With this, a nonconductive adhesive part 47a is also formed between the clearances 52 and a circumferential side surface 23c of a piezoelectric element 23 embedded in the opening 21.

Figure 7:
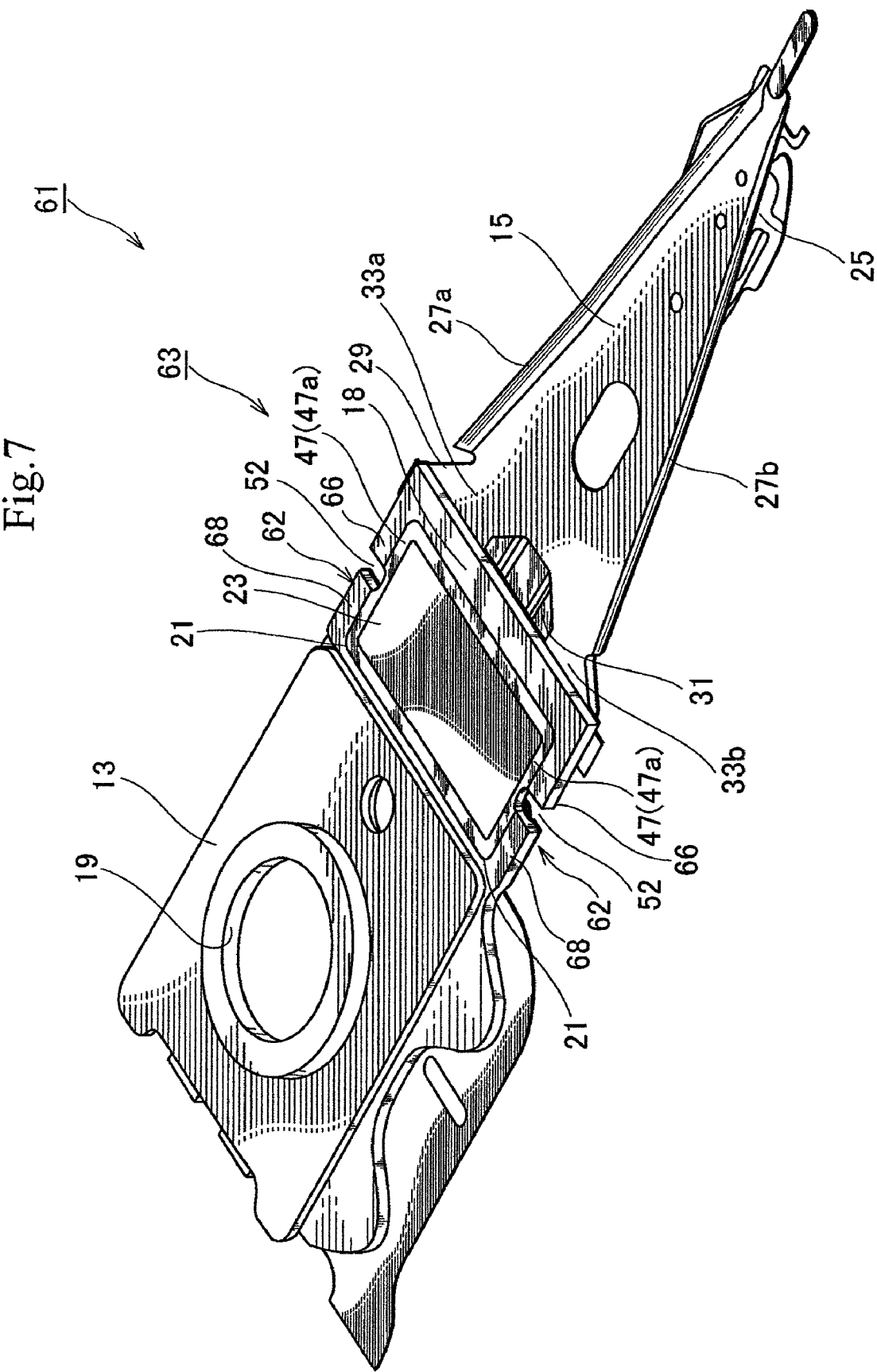
FIG. 7 is a perspective view illustrating a head suspension according to a second embodiment of the present invention.

Incidentally, the fillers 48 have the same configurations as those of the first embodiment, so that the fillers 48 are omitted in FIG. 7.

In the head suspension 61 of the second embodiment, the opening 21, a nonconductive adhesive part 47a, nonconductive fillers 48 that are embedded in the nonconductive adhesive 47, and the piezoelectric element 23 are joined together to function as a solidified support beam.

This configuration secures stiffness of the head suspension 61 without employing the flexible links 50 of the first embodiment.

The clearances 50 formed substantially at a central part on each outer side of the opening 21 do not block a displacement stroke of the piezoelectric actuator 63 in a sway direction.

The head suspension 61 of the second embodiment, therefore, secures basic characteristics such as vibration and impact characteristics without deteriorating a displacement stroke of the piezoelectric actuator 63.

The second embodiment reduces widthwise dimensions of the head suspension 61, increases the number of parts to be taken out of materials, and improves the productivity of head suspensions.

The head suspension 61 according to the second embodiment has substantially the same width as standard head suspensions, and therefore, is manufacturable through an existing manufacturing line. This may reduce facility investment.

Producing the actuator base 18 according to the second embodiment may involve pressing and barreling. In this case, burrs will smoothly be removed from the actuator base 18 because the actuator base 18 has no protruding parts such as the flexible links. Namely, the second embodiment secures smooth work and reduces manufacturing costs.

When designing a magnetic disk drive in which the head suspension is installed, the head suspension 61 of the second embodiment involves no protruding parts such as the flexible links, and therefore, there is no need of considering interference with peripheral parts. This increases the degree of freedom in designing an arrangement of peripheral parts around the head suspension 61 in the magnetic disk drive.

In connection with vibration characteristics, the head suspension 61 according to the second embodiment has no protruding parts such as the flexible links, and therefore, there is no need of considering vibration modes that never occur on standard head suspensions. Accordingly, the head suspension 61 of the second embodiment, which demonstrates the effect of the first embodiment as well, can be designed through standard design steps.

A head suspension according to the third embodiment of the present invention will be explained with reference to FIG. 8.

The head suspension 71 according to the third embodiment is configured basically the same as the head suspension 61 of the second embodiment. In this embodiment, like parts are represented with like reference marks of the second embodiment and differences between the second and third embodiments will mainly be explained.

According to the second embodiment of FIG. 7, the piezoelectric actuator 63 of the head suspension 61 employs a single piezoelectric element 23 arranged in a single opening 21.

Figure 8:
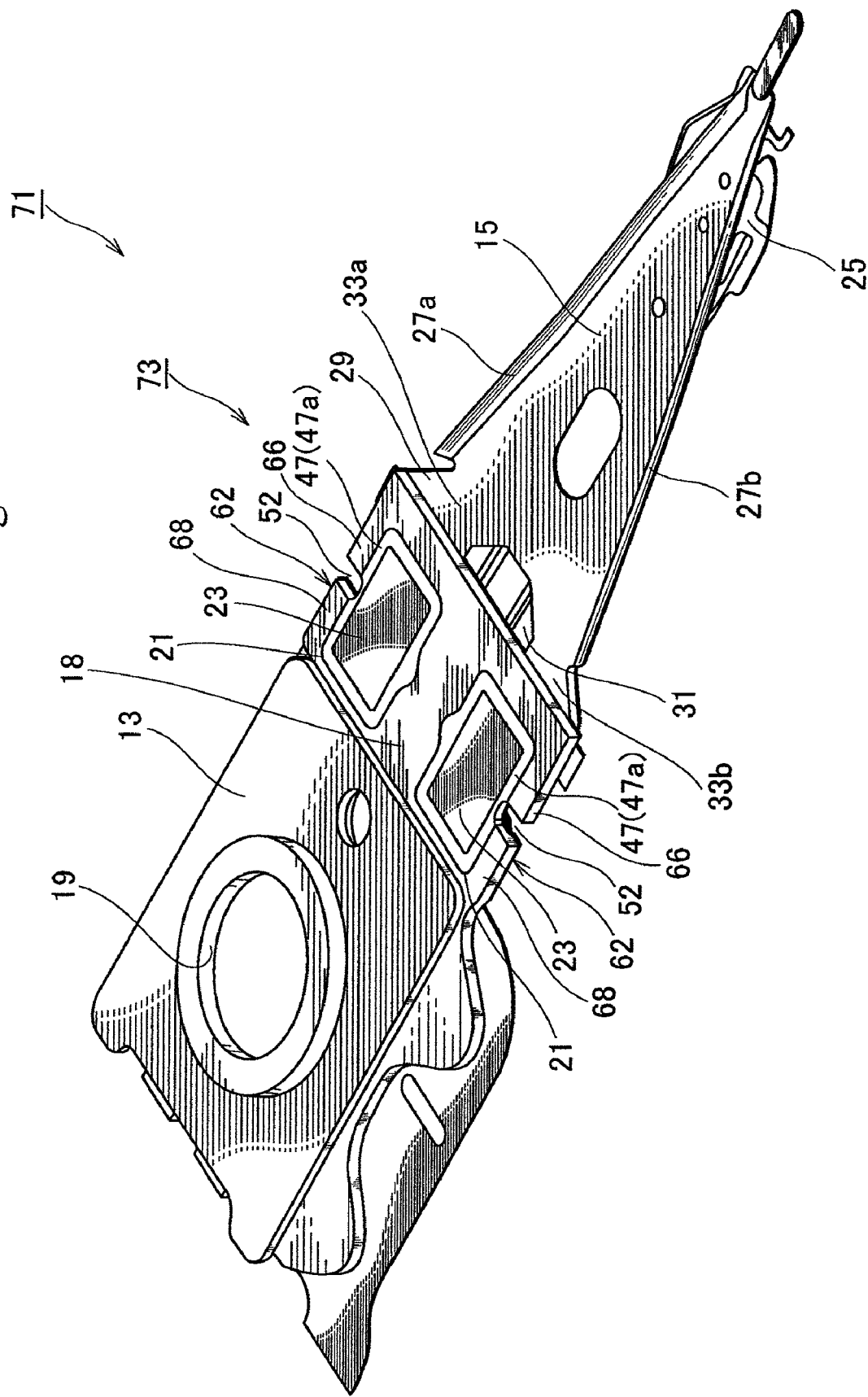
FIG. 8 is a perspective view illustrating a head suspension according to a third embodiment of the present invention.

According to the third embodiment of FIG. 8, the head suspension 71 has a piezoelectric actuator 73 that employs two piezoelectric elements 23 arranged in two openings 21, respectively.

Incidentally, the fillers 48 have the same configurations as those of the first embodiment, so that the fillers 48 are omitted in FIG. 8.

The head suspension 71 according to the third embodiment provides the same effect as the second embodiment.

The present invention is not limited to the embodiments mentioned above and is modifiable according to the descriptions of the claims and specification without departing from the scope thereof.

For example, the load beam 15 and actuator base 18 that are separate from each other according to the embodiments may be integral with each other.

The number of the openings 21 in the actuator base 18 and the number of the piezoelectric elements 23 in the openings 21 may each be three or more instead of one or two of the embodiments.

According to the embodiments, the nonconductive adhesive part 47a is continuously formed around the piezoelectric element 23. Instead, the adhesive part 47a surrounding the piezoelectric element 23 may be discontinuous at each cut 64 (clearance 52).

The above-mentioned embodiments are based on an assumption that the head suspension is arranged above a magnetic disk in a magnetic disk drive so as to face the magnetic disk. In practice, the head suspension is also arranged below the magnetic disk so as to face the same. The present invention is applicable to each case by properly interpreting positional expressions in the explanation of the embodiments depending on the case.

What is claimed is:

1. A head suspension having a load beam and a piezoelectric actuator, the piezoelectric actuator supporting a base part of the load beam and configured to displace a front end of the load beam in a sway direction, the head suspension comprising:

the piezoelectric actuator having an actuator base and at least a piezoelectric element, the actuator base connected to the base part of the load beam and having at least an opening, the piezoelectric element attached to the opening and deforming in response to a voltage applied thereto to conduct displacement of the front end of the load beam;

a circumferential edge of the opening to define the opening in the actuator base;

a bottom receiver inwardly protruding from the circumferential edge to face the piezoelectric element so that a bottom gap is defined between the piezoelectric element and the bottom receiver in a thickness direction of the piezoelectric element;

a circumferential side face of the piezoelectric element, facing the circumferential edge of the opening in a direction orthogonal to the thickness direction;

a circumferential channel defined between the circumferential edge of the opening and the circumferential side face of the piezoelectric element;

a nonconductive filler fitted into the circumferential channel to maintain a width of the circumferential channel; and a nonconductive adhesive part formed in the circumferential channel and the bottom gap, the part formed in the circumferential channel joining the circumferential edge of the opening to the circumferential side face of the piezoelectric element and the part formed in the bottom gap joining the bottom receiver to the piezoelectric element, wherein the nonconductive filler has a diameter that is equal to a gap defined by the circumferential channel in the direction orthogonal to the thickness direction so that the nonconductive filler contacts both the circumferential side face of the piezoelectric element and the circumferential edge of the opening or a diameter that is slightly smaller than the gap of the circumferential channel so that a difference between the diameter of the nonconductive filler and the gap of the circumferential channel is smaller than a difference between the gap of the circumferential channel and the bottom gap.

2. The head suspension of claim 1, wherein the opening and piezoelectric element are substantially rectangular,
the nonconductive filler is substantially spherical, and
a plurality of such nonconductive fillers are arranged in the circumferential channel along each side of the piezoelectric element.

3. The head suspension of claim 2, wherein the nonconductive fillers arranged along each pair of opposite sides of the piezoelectric element are symmetrical with respect to the center of the piezoelectric element.

4. The head suspension of claim 1, further comprising:
a pair of flexible links formed on the actuator base on each side of the opening and each having a U-shape protruding outwardly from the opening.

5. The head suspension of claim 1, further comprising:
a pair of clearances each formed across the actuator base on an outer side of the opening.

6. The head suspension of claim 1, wherein the actuator base has two openings formed side by side in a width direction of the load beam, and
the piezoelectric actuator has two piezoelectric elements arranged in the openings, respectively.

7. The head suspension of claim 1, wherein:
the bottom receiver is formed on the actuator base and faces a bottom face of the piezoelectric element.

* * * * *